(12) United States Patent
Pervaiz

(10) Patent No.: US 8,387,235 B2
(45) Date of Patent: Mar. 5, 2013

(54) APPARATUS FOR THE DISASSEMBLY AND INSTALLATION OF ELECTRIC MOTOR COMPONENTS

(75) Inventor: Muhammad Pervaiz, Erie, PA (US)

(73) Assignee: General Electric Company, Schenectady, NY (US)

( * ) Notice: Subject to any disclaimer, the term of this patent is extended or adjusted under 35 U.S.C. 154(b) by 988 days.

(21) Appl. No.: 12/339,468

(22) Filed: Dec. 19, 2008

(65) Prior Publication Data

US 2010/0154201 A1 Jun. 24, 2010

(51) Int. Cl.
*H02K 15/00* (2006.01)
*H02K 15/16* (2006.01)

(52) U.S. Cl. ............................. 29/732; 29/762

(58) Field of Classification Search ............... 29/281.1, 29/281.4, 244, 250, 251, 252, 762, 732, 596, 29/598

See application file for complete search history.

(56) References Cited

U.S. PATENT DOCUMENTS

| | | | | |
|---|---|---|---|---|
| 4,532,689 A | * | 8/1985 | Harder et al. | 29/426.5 |
| 4,763,394 A | * | 8/1988 | Decato et al. | 29/252 |
| 5,619,782 A | * | 4/1997 | Tanaka et al. | 29/407.1 |
| 6,126,402 A | | 10/2000 | Fisher et al. | |
| 6,599,103 B2 | | 7/2003 | Finnamore et al. | |
| 6,609,899 B1 | | 8/2003 | Finnamore | |
| 6,631,541 B2 | * | 10/2003 | Mosing et al. | 29/252 |
| 2006/0013698 A1 | | 1/2006 | Pervaiz et al. | |

* cited by examiner

*Primary Examiner* — Livius R Cazan
(74) *Attorney, Agent, or Firm* — GE Global Patent Operation; John A. Kramer

(57) ABSTRACT

An apparatus for removing and installing a rotor in an electric motor that is coupled to a shaft of a machine comprises a table having a support area for supporting and mounting the machine and motor. A tool is positioned on the table to move back and forth relative to the machine and motor, and engages the rotor to remove and install the rotor. A flange on the tool is secured to a temporary flange on a rotor sleeve. The tool also includes a piston concentrically aligned with the rotor and shaft to engage the shaft. A driving mechanism is linked to the piston to actuate the piston in a backward or forward direction relative to the machine and motor. The tool housing, responsive to movement of the piston, moves on the table in a direction opposite to the direction of movement of the piston to remove or install the rotor.

12 Claims, 14 Drawing Sheets

APPARATUS FOR THE DISASSEMBLY AND INSTALLATION OF ELECTRIC MOTOR COMPONENTS

BACKGROUND OF THE INVENTION

Embodiments of the invention generally relate to machines, such as air compressor systems, that incorporate electric motors having internal components including a stator and rotor. More specifically, embodiments of the invention relate to the disassembly and installation of components of the electric motor for testing, reconditioning, or replacing such components.

Machines such as air compressors are used on locomotives and include electric motors to power the compressors, which generate and supply compressed air to operating components on the locomotive. The compressor and electric motors may be operating over extended periods of time and are subject to extreme conditions. Over time, components of the electric motor may fail or require maintenance. Accordingly, the components of an electric motor such as the rotor and stator must be removed from the electric motor housing on the compressor in order to replace or recondition the components. For larger machinery, these components may weigh as much as or more than 500 pounds (226.8 kilograms). The disassembly and installation of these components can be cumbersome and dangerous.

With reference to FIGS. 1, 2, and 3 there is provided schematic illustrations of a system or method used for the disassembly and installation of an electric motor on a machine such as a compressor. As shown in FIG. 1, there is a compressor 10 including an electric motor 12 and a hydraulically driven tool 14 prepared for disassembly or installation of components of the motor 12. The tool 14 includes a piston 40 supported in a housing 38, and the tool 14 is connected to a hydraulic system (not shown) for driving the piston 40 backward and forward relative to the motor 12 and compressor 10. A flange 32 on the housing is used to secure the tool 14 to the rotor 18 for removal and installation of the rotor 18. A crane 16 is provided for lifting and aligning the tool 14 with the rotor 18 and shaft 24. The tool 14 is suspended from the crane 16 with a sling 42, so the tool 14 may sway or move responsive to movement of the piston 40 as explained below.

As shown in FIG. 2, a motor cover and fan have been removed from the motor 12, and a temporary flange 30 is mounted to a rotor sleeve 22. The motor 12 components shown include a stator 20 and rotor 18. A rotor sleeve 22 is disposed between the compressor shaft 24 and rotor 18 on which a fan (not shown) is mounted. The stator 20 and rotor 18 and an end of the compressor shaft 24 are maintained within a motor housing 34, which is bolted to a compressor housing 36. The crane 16 and tool 14 are moved into position so that an end of an adapter 28 on the piston 40 engages an end of the shaft 24. The housing flange 32 is bolted and secured to the temporary flange 30, which is mounted to the rotor sleeve 22. A hydraulic system (not shown) drives or actuates the piston 40 forward or towards the motor 12 and compressor 10. By doing so, the weight of the compressor 10 forces the tool 14 on the crane 16 to move backwards away from the compressor 10, pulling the rotor 18 out of the motor housing 34 and from the stator 20. When the rotor 18 is removed in this manner, the rotor will drop or tilt as a result of the added weight of the rotor 18, striking other components including the stator and motor housing 34, which may cause damage to the components of the motor 12. In addition, the tool 14 and rotor 18 may have a tendency to sway on the crane 16, which could cause injury.

In reference to FIG. 3, there is shown the electric motor 12, with the rotor 18 having been installed in the motor 12. In preparation for the installation of the rotor 18, the temporary flange 30 is mounted on the rotor sleeve 22, and crane 16 is used to lift the rotor 18, align the rotor 18 with the shaft 24, and place the rotor 18 into the motor 12; however, because of the tight fitting between the rotor 18 and stator 20, the tool 14 is required to force the rotor 18 into its operating position within the motor 12. Before the tool 14 is used, a second adapter 44 is threaded onto the nose of the compressor shaft 24, and then affixed to the piston 40 and tool 14. The tool 14, with the second adapter 44, is then used to force the rotor 18 in to its operating position. The hydraulic system is activated, causing the piston 40 to retract and pull the shaft 24. As a result of the weight and size of the compressor 10, the tool 14 moves towards the compressor 10 and motor 12, positioning the rotor 18 in place in the motor 12. The piston 40 is then released from the second adapter 44, which is then removed from the compressor shaft 24. In addition, the temporary flange 30 is then removed and the components including the fan and motor cover are installed.

BRIEF DESCRIPTION OF THE INVENTION

An embodiment of the invention comprises an apparatus for removing and installing a rotor in an electric motor that includes a stator and a rotor that is coupled to a shaft of a machine for providing a rotational force to the shaft of the machine. (For example, the machine might be an air compressor, with the motor being attached to the air compressor for driving a compressor shaft, fan, etc.) The apparatus comprises a support table having a support area for supporting and mounting the machine and motor. A tool is mounted on the table for engaging, removing, and installing the rotor, and the tool is operatively connected to the table to move back and forth on the table relative to the machine and motor. The tool comprises a housing that is detachably coupled to the rotor and a piston extending there from, which has an end concentrically aligned with the rotor and shaft, and which is positioned for engagement with an end of the shaft. In addition, a driving mechanism is linked to the piston and actuates and moves the piston in a backward or forward direction relative to the machine and motor. The tool housing, responsive to movement of the piston, moves on the table in a direction opposite to the direction of movement of the piston to remove or install the rotor. The apparatus may include a tool alignment system having at least one track that is disposed parallel to a longitudinal axis of the tool or motor. A carriage, which supports the tool housing, is operatively connected to the track to maintain alignment of the rotor relative to the longitudinal axis of the motor during installation or removal of the rotor.

Another embodiment of the invention comprises a method for removing or installing components of an electric motor, wherein the motor includes a rotor operatively connected to a shaft of a machine for providing a rotational force to the shaft. The method comprises mounting the machine at a machine support area for installation or removal of the rotor. The rotor is installed and removed using a tool, which is operatively connected to a tool alignment system including at least one track is disposed parallel to a longitudinal axis of the rotor or motor. The tool alignment system maintains alignment of the tool and rotor relative to the motor during installation or removal of the rotor. The tool includes a piston mounted within a housing, and the piston moves back and forth relative to the motor. In addition, the method comprises engaging an end of the shaft with an end of the piston; securing the housing of the tool to the rotor; and actuating the piston to move forward toward the motor and the tool moves backward away from the motor to remove the rotor, or actuating the piston to move backwards relative to the motor and the tool moves toward the motor for installation of the rotor. In another embodiment, the machine support area includes a support table, with the at least one track of the tool alignment system being connected to the support table. In this embodiment, the method further comprises moving the tool back and forth on a carriage for installing and removing the rotor, with the carriage being operatively connected to the track on the support table.

BRIEF DESCRIPTION OF THE DRAWINGS

The present invention can be more easily understood and the further advantages and uses thereof more readily apparent, when considered in view of the following detailed description when read in conjunction with the following figures, wherein.

DETAILED DESCRIPTION OF THE INVENTION

Figure 1:
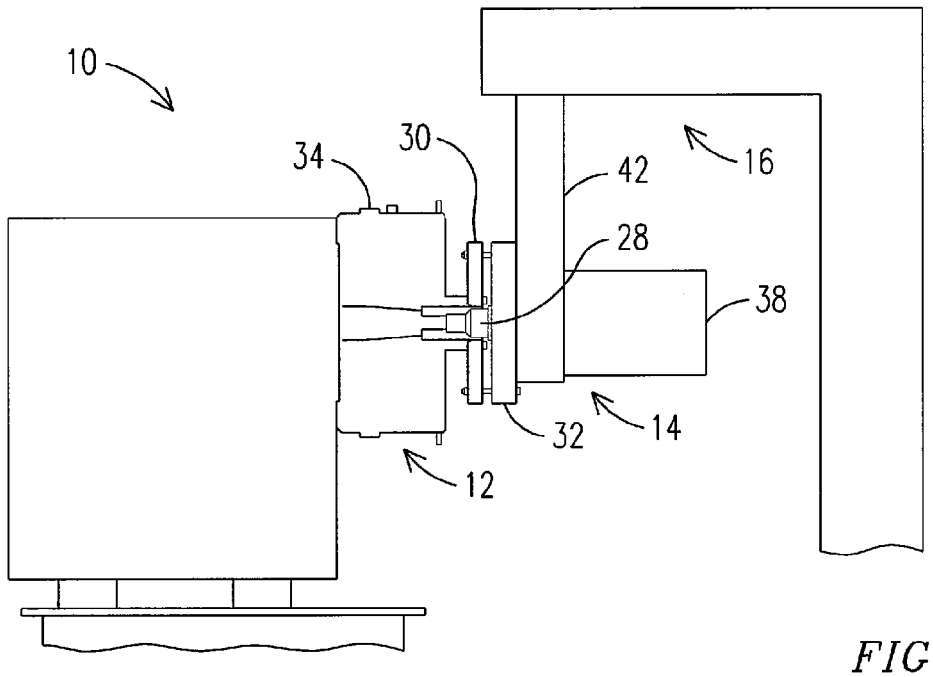
FIG. 1 is a schematic illustration of a prior art system for removal or installation of a rotor from an electric motor on a compressor.

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained. While the invention is described below in reference to electrical motors on air compressors, and may refer to compressors on locomotives and trains the invention is not so limited. The invention may used with other machines that utilize electrical motors including a rotor that may require removal for replacement or maintenance and machines used on other vehicles including marine, off-highway vehicles, on-road vehicles, etc.

With respect to FIGS. 4, 5, 6 and 11, there is illustrated an apparatus 50 for removing and installing a rotor 170 (see FIG. 11) from an electrical motor 70 used in operation of a machine 72 such as an air compressor. The apparatus 50 includes a tool 52 that is operatively connected to a table 54 to move back and forth relative to the motor 70 and machine 72 to remove or install a rotor in the motor 70. The table 54 has a tool alignment system 58 that includes one or more tracks 62 is disposed parallel to a longitudinal or central axis 126 of the tool 52 and electric motor 70, and are supported by various frame members 68 of the table 54. The tool 52 is mounted on a carriage 60, which is positioned on the tracks 62 to move back and forth relative to the motor 70 and machine 72. In reference to FIG. 7, the carriage 60 includes a carriage frame 64 having wheels 66 mounted thereon for movement of the carriage 60 and tool 52 on the table 54. As explained in more detail, the tracks 62 provide a tool alignment structure on the table 54 so the tool 52 remains aligned with the motor 70 on the machine during installation and removal of the rotor 170. While the embodiment described herein refers to a carriage with wheels travelling on the illustrated L-shaped tracks, other types of track systems may be incorporated such as tracks having channels with sliding mechanisms, such as bearings, may enable sliding a carriage on the table. In addition, the invention is not limited to the table 54 shown in the drawings, and may include an overhead track system with the machine 72 positioned relative to the tool 52 for disassembly or installation of the components.

In addition, a machine and motor support area 56 is provided for supporting and mounting the machine 72. A platform 92 is disposed between the carriage 60 and the support area 56 to support the rotor 170 during installation or disassembly, or otherwise prevent the rotor 170 from falling to the ground.

As shown, the tool 52 includes a cylindrical housing 76 with a piston 74 secured therein. The piston 74 is driven by a driving mechanism 78, e.g., a hydraulic pump 78 that is in fluid communication with the piston 74. As explained in more detail, the piston 74 is adapted to engage an end of a shaft 176 of the machine 72 for installation and removal of the rotor 170. Hydraulic lines 86, 88 and ports 80, 82 provide fluid communication between the hydraulic pump 78 and piston 74. The hydraulic pump 78 may be a hydraulic reversible pump to actuate the piston 74 backward and forward relative to a machine 72 mounted on the table 54, and includes a control or selector switch to actuate a one-way valve connected to both lines 86, 88 (and/or ports 80, 82) and control the direction of flow of hydraulic fluid. In addition, the tool 52 includes a flange 90 mounted to the housing 76 to detachably secure or couple the tool 52 to a rotor 170 in the electrical motor 70 for installation or removal of the rotor 170.

Figure 7:
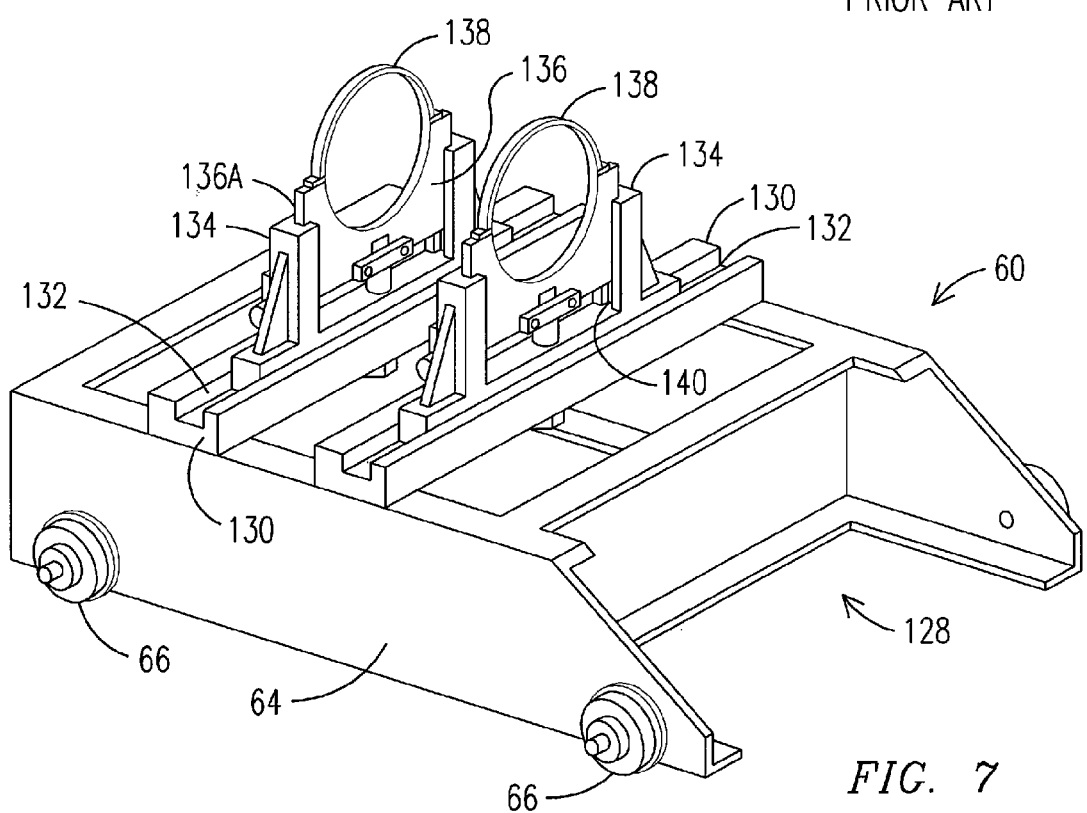
FIG. 7 is a perspective view of a carriage portion of the apparatus without the tool.
Figure 2:
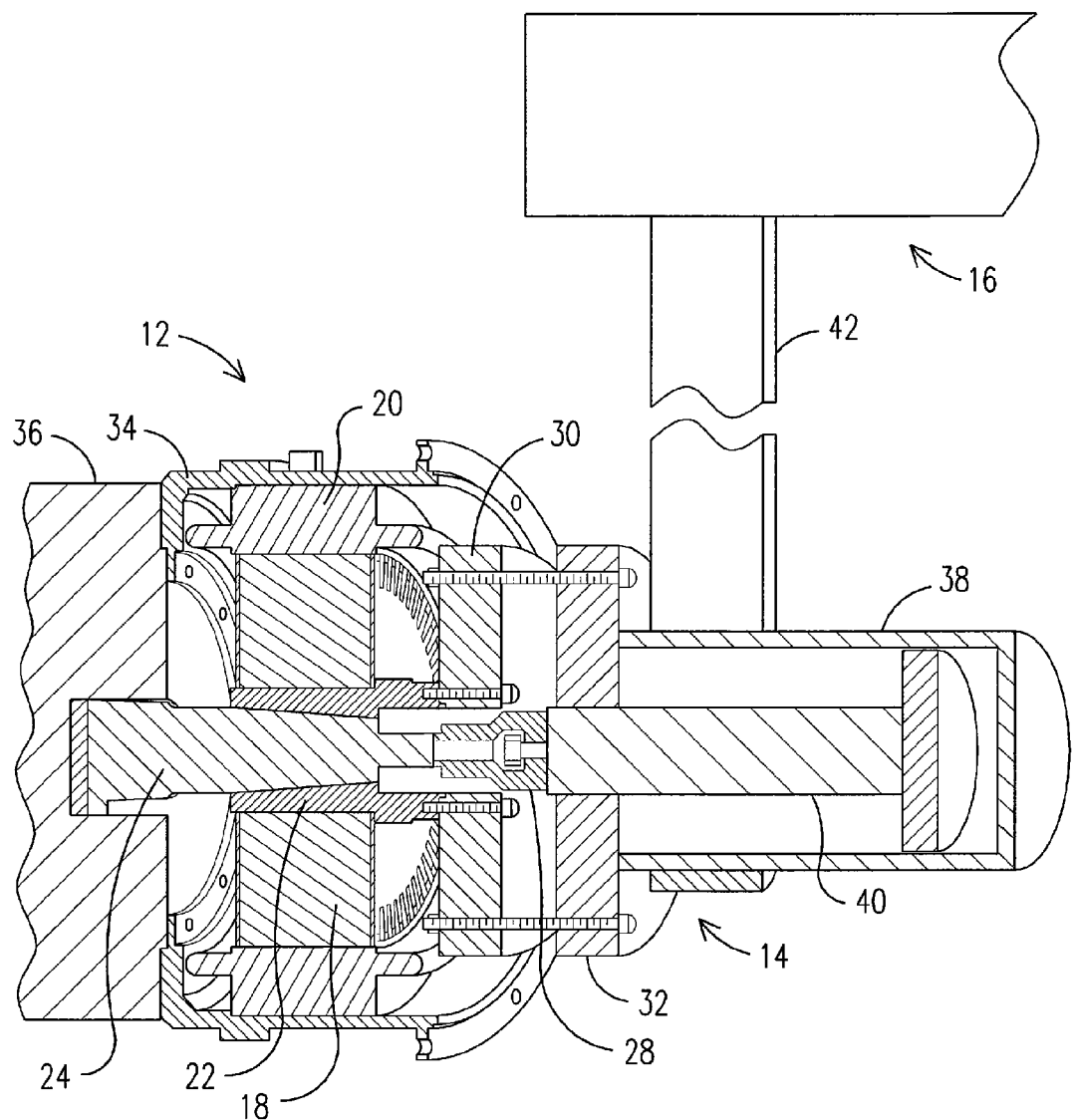
FIG. 2 is a sectional view of the system in FIG. 1 attached to the rotor in the motor for removal of the rotor.
Figure 3:
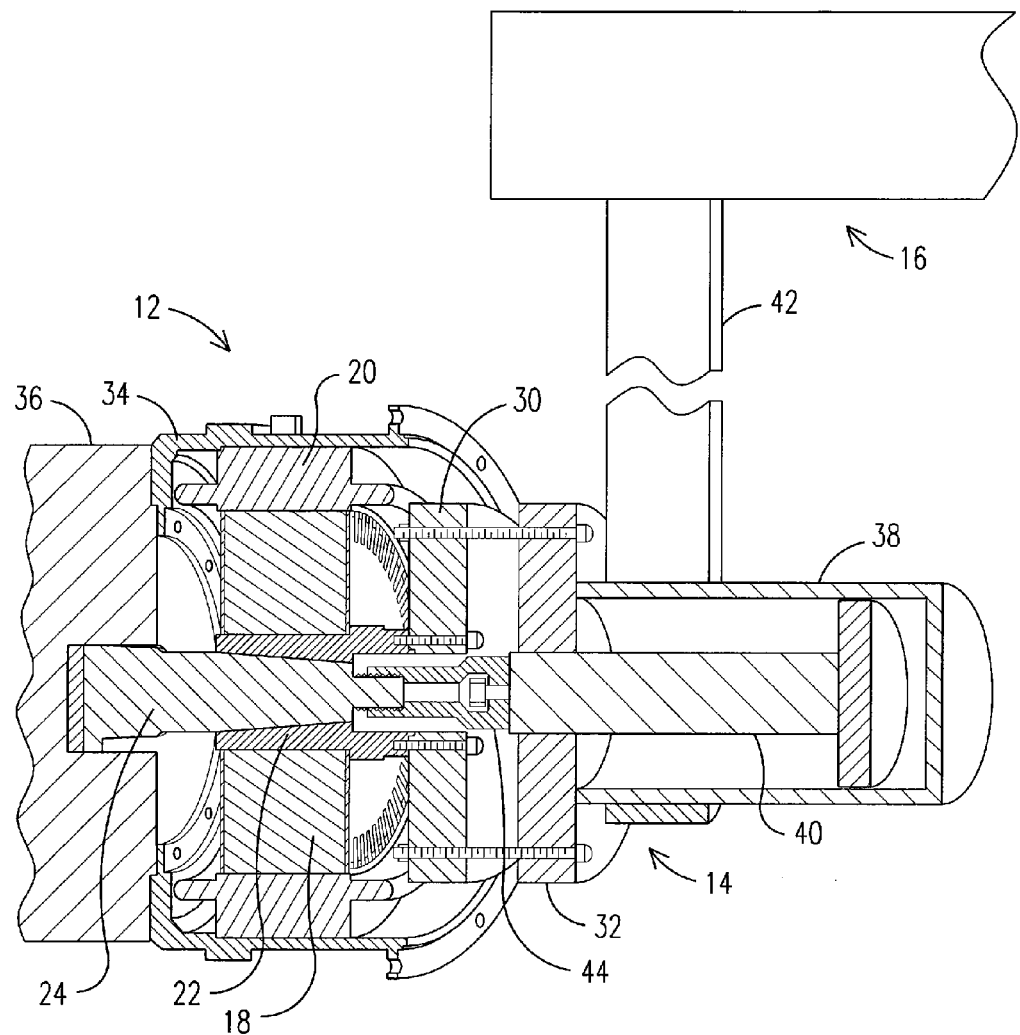
FIG. 3 is a sectional view of the system in FIG. 1 with an adapter attached to the compressor shaft for installation of a rotor.
Figure 4:
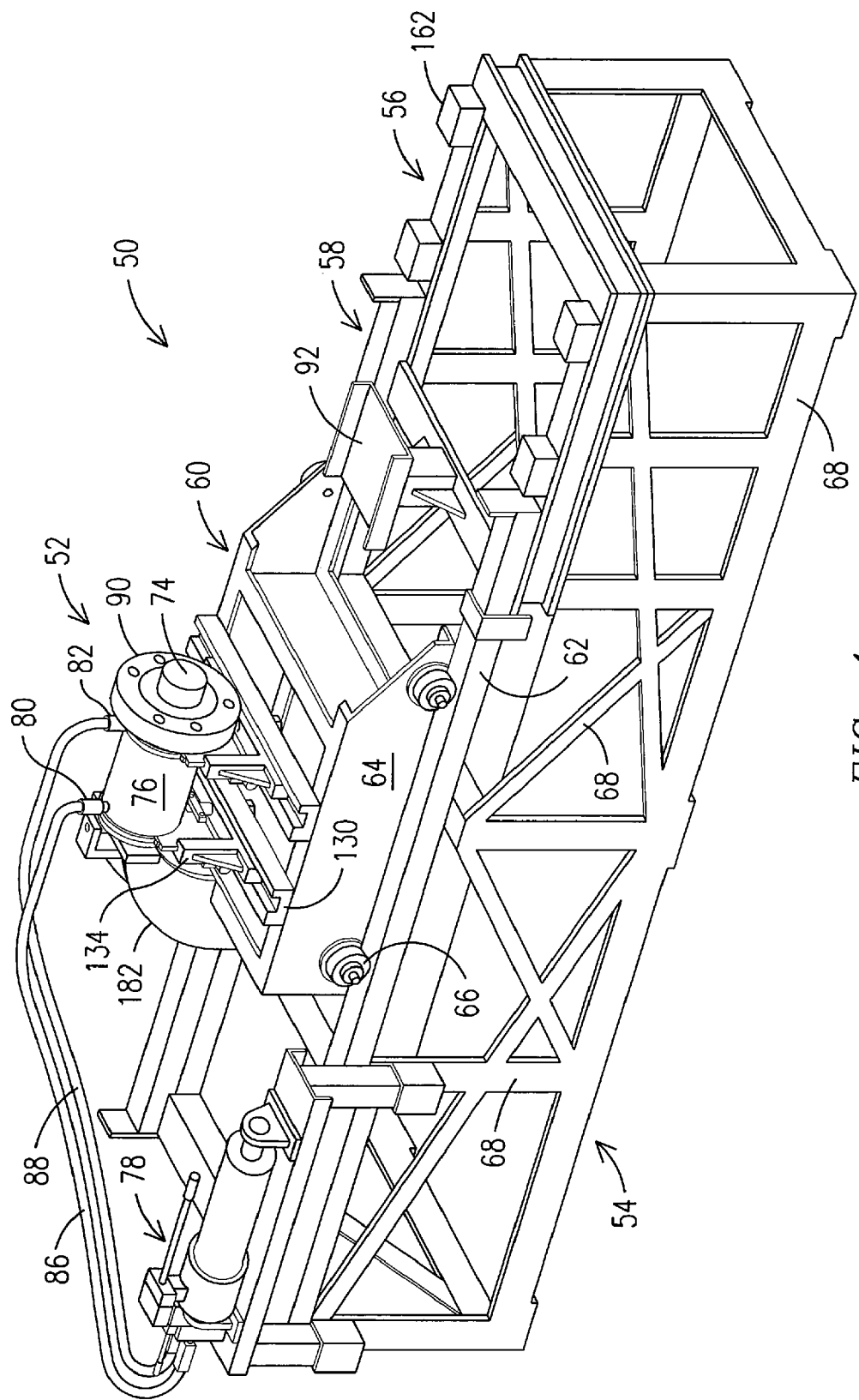
FIG. 4 is a perspective view of an embodiment of the invention, relating to an apparatus for installing and removing a rotor in an electric motor, including a rotor remover and installation tool mounted on a table.
Figure 5:
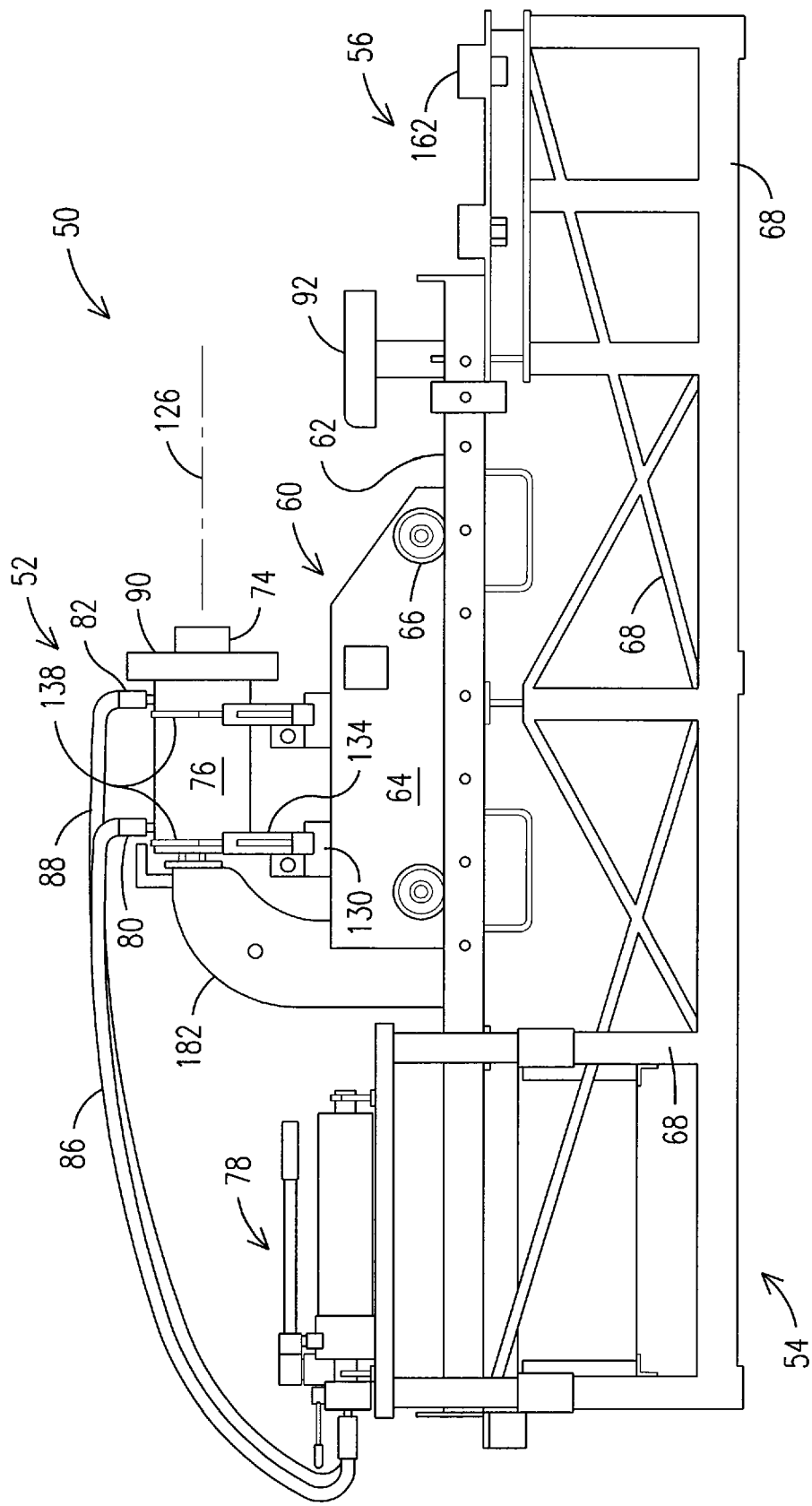
FIG. 5 is a side view of the embodiment shown in FIG. 4.
Figure 6:
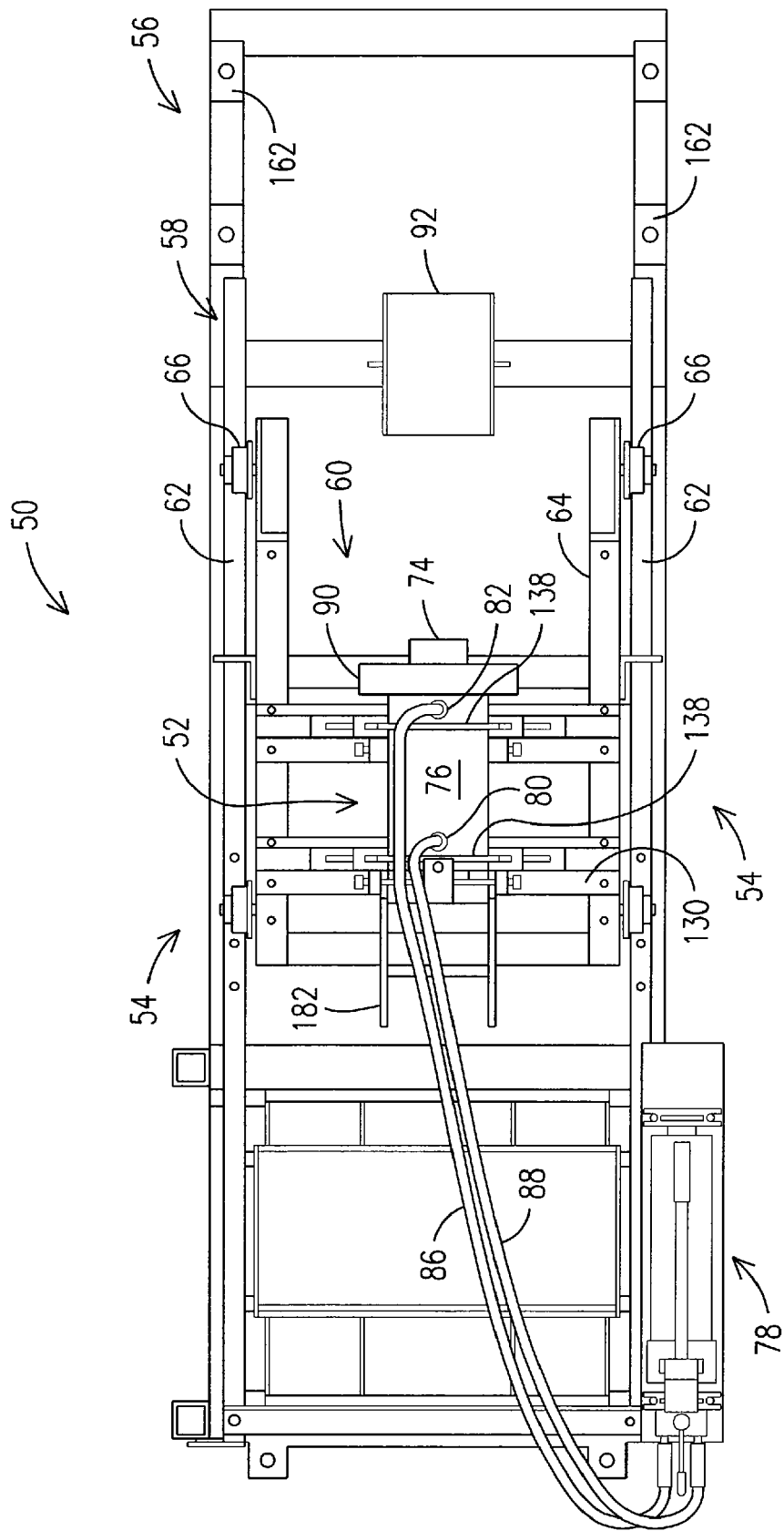
FIG. 6 is a top view of an embodiment of the invention shown in FIG. 4.
Figure 8:
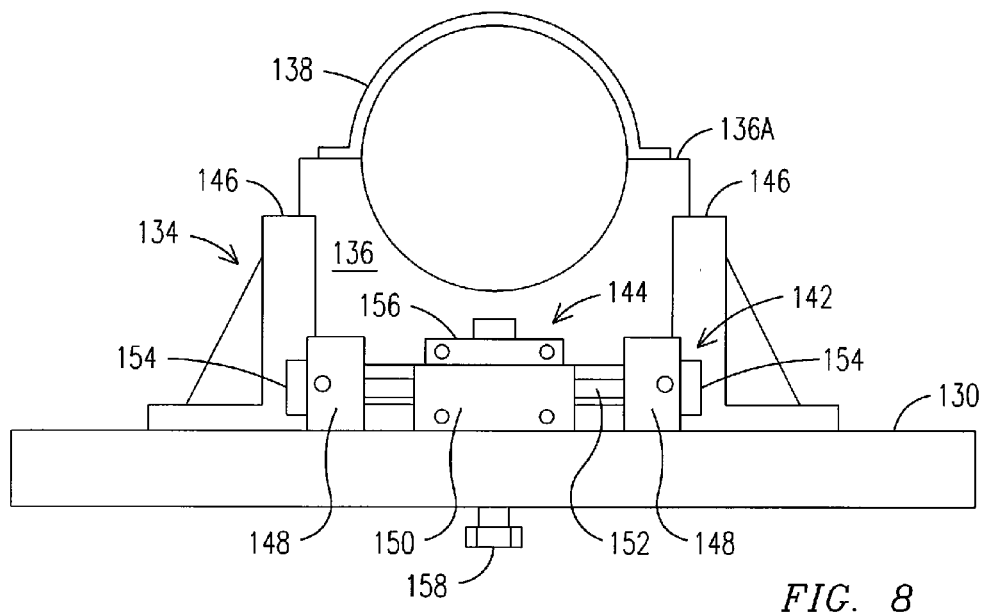
FIG. 8 is a rear view of the carriage with lateral and vertical adjustment assemblies

With respect to FIGS. 7 and 8, the carriage 60 is illustrated in more detail. More specifically, the carriage 60 includes a carriage frame 64. A front end 128 of the carriage frame 60 is generally U-shaped in order to avoid the platform 92, so that the tool 52 may be mounted to the rotor 170 during disassembly. The tool 52 is supported and secured on the carriage by cross-rails 130, brackets 134, support plates 136, and clamps 138. In the embodiment shown in FIGS. 7 and 8, the cross-rails 130 are disposed orthogonally with respect to longitudinal axis 126 of the tool 52. The cross-rails 130 include channels 132 in which the brackets 134 are disposed and moveable therein to adjust a lateral position of the tool 52 relative to the rotor 170 and motor 70. The brackets 134 each include a pair of spaced-apart vertical posts 146. Each of the posts 146 includes vertically disposed channels 140 in which edges 136A of the support plates 136 are disposed. The support plates 136 are movable within these vertical channels to provide a vertical adjustment of the tool 52 with respect to the electric motor 70 and rotor.

In FIG. 8, there is shown a lateral adjustment mechanism 142 and a vertical adjustment mechanism 144. The lateral adjustment mechanism 142 includes two spaced-apart stationary blocks 148 and a movable block 150 between the stationary blocks 148. A bolt 152 extends through the stationary blocks 148 and movable block 150, which includes an internal thread so that when the bolt 152 is rotated by adjusting one or both of a pair of knobs 154, the block 150 moves laterally. The block 150 is bolted to the bracket 134 so that when the knobs 154 are adjusted, the block 150 will move the bracket 134 laterally for the lateral adjustment of the tool 52 relative to the motor 70 and rotor 170.

The vertical adjustment mechanism 144 includes a block 156 mounted to the support plate 136. The block 156 is disposed above or on top of the block 150 of the lateral adjustment assembly 142; however, the blocks 150 and 156 are not attached to one another so the block 156 attached to the support plate 136 may move up and down relative to the block 150 or table 54. A vertically disposed bolt (not shown) is threaded through the block 156, and a knob 158 is provided as shown below the cross-rail 130. Adjustment of the knob 158 provides for the vertical adjustment of the support plate 136 and tool 52 relative to the motor 70 and rotor 170.

Figure 9:
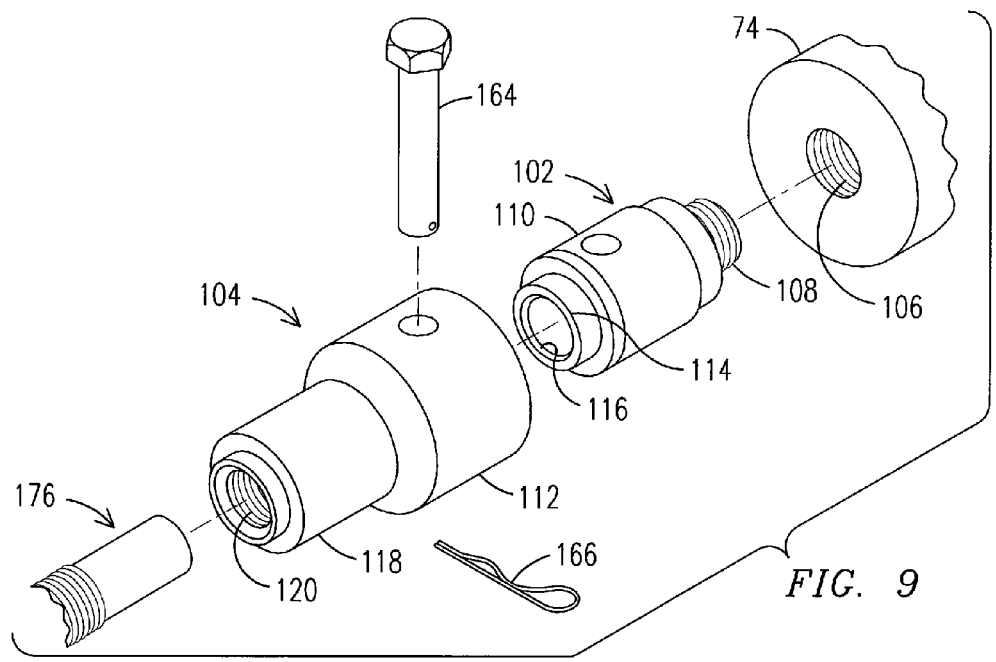
FIG. 9 is a perspective view of adapters used with the tool.

With respect to FIG. 9, there is shown first and second adapters 102, 104 that are mounted to an end of the piston 74 for engagement with an end of the shaft 176 of the machine 72. The first adapter 102 is used for engaging the shaft 176 to remove the rotor 170 from the electric motor 70. The second adapter 104 is detachably secured to the first adapter 102 for installation of the rotor 170. As shown, the first adapter 102 includes a main body portion 110 and a male threaded end 108, which is threaded onto a threaded recess 106 on the end of the piston 74. A hub 114 is attached to the body portion 110 opposite the male threaded end 108 and includes a recessed lip 116 for engaging the end of the shaft 176 as explained in more detail below.

The second adapter 104 includes a body portion 112 that has an inside diameter that is larger than an outside diameter of the body portion 110 of the first adapter 102. Therefore, when the rotor 170 is prepared for installation, the second adapter 104 and first adapter 102 are fitted in mating relationship and secured with a bolt 164 and clip 166. The second adapter 104 includes a hub 118 attached to the body portion 112 having a female thread 120 for securing the second adapter 104 and piston 74 to a threaded end of the shaft 176.

Figure 10:
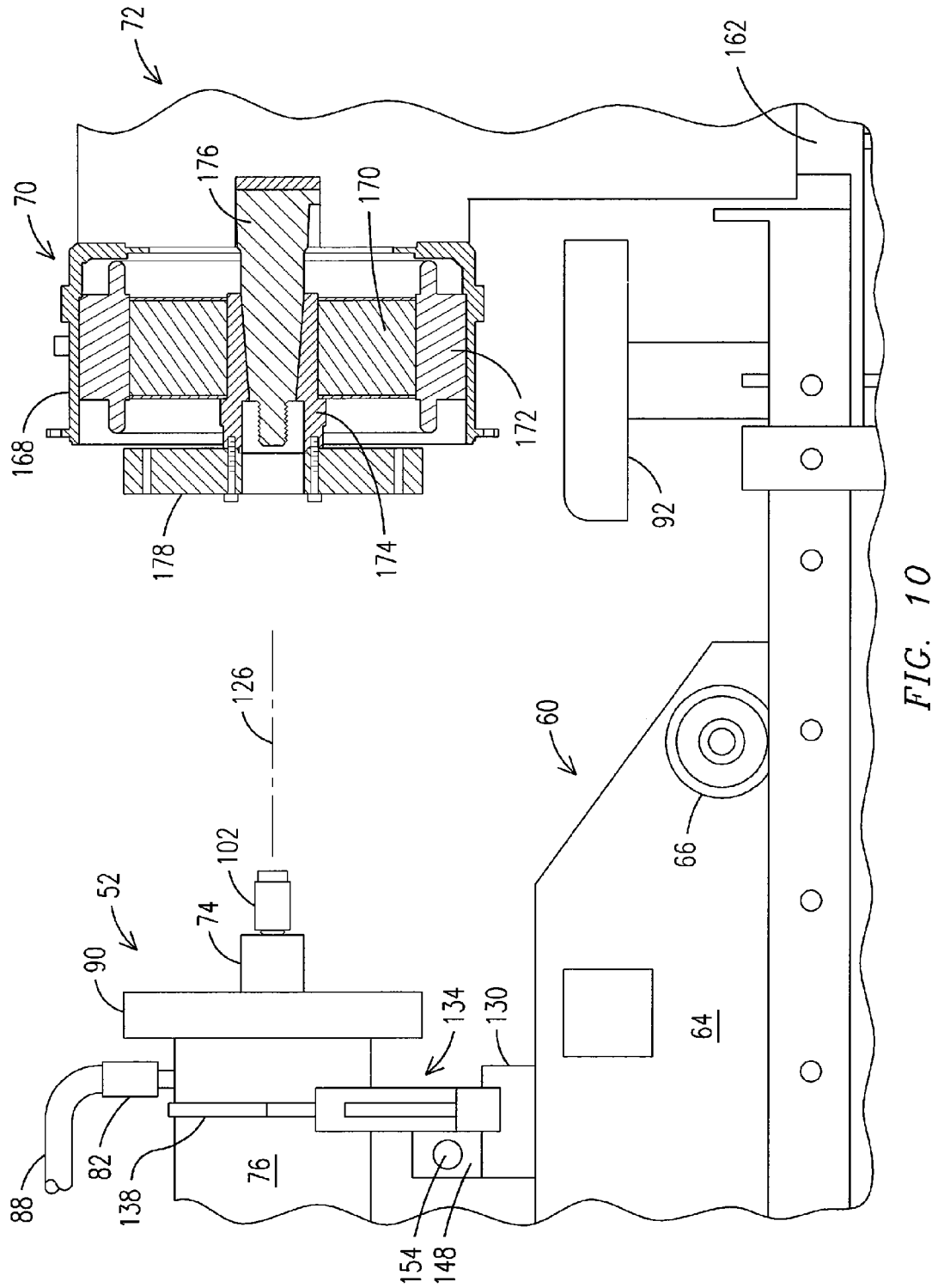
FIG. 10 is a side view of the embodiment of the invention with a compressor and motor mounted on the table and a sectional view of the motor having a temporary flange mounted on the rotor sleeve.
Figure 11:
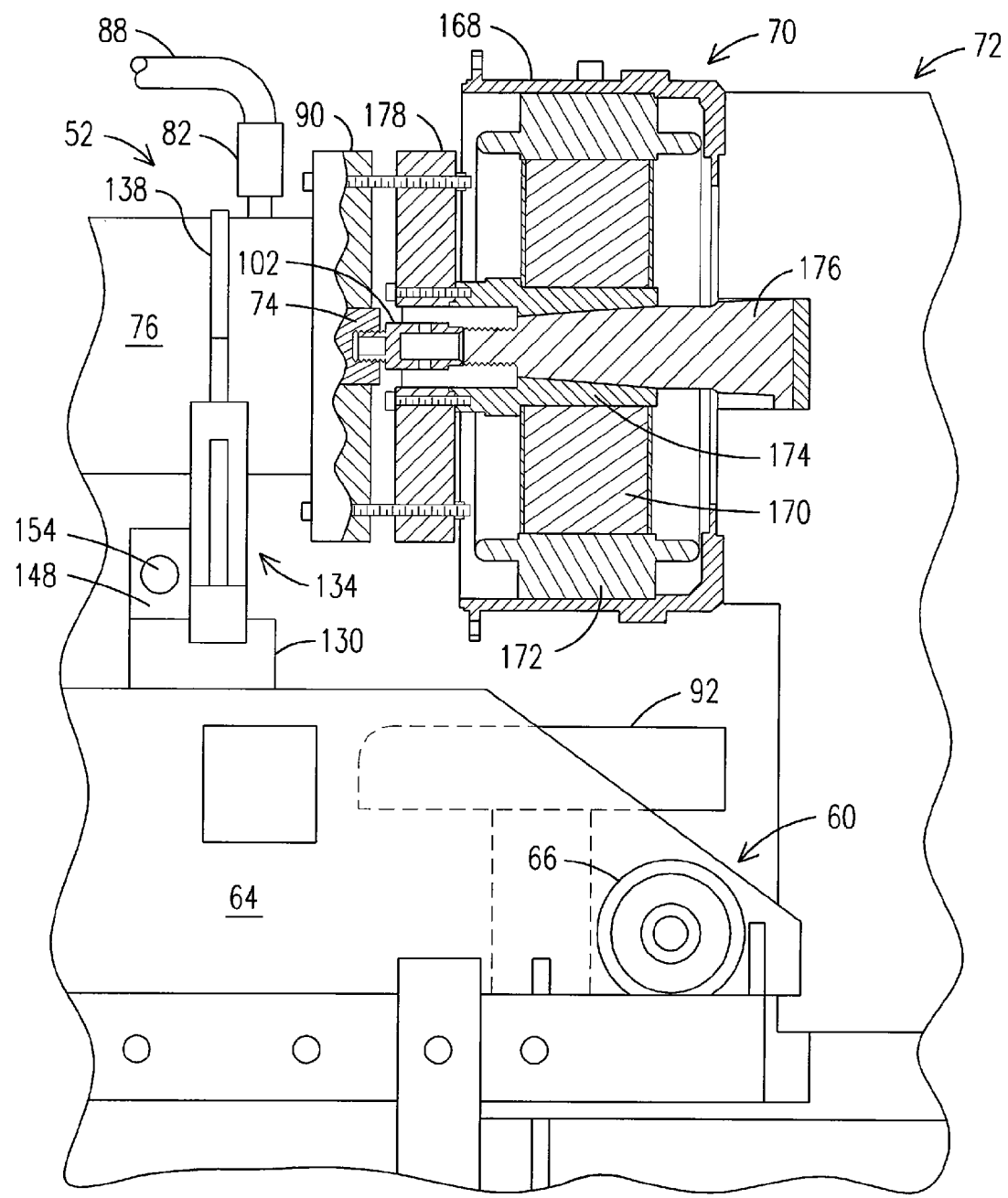
FIG. 11 is a sectional view showing the adapter abutting the compressor shaft for removal of the rotor.
Figure 12:
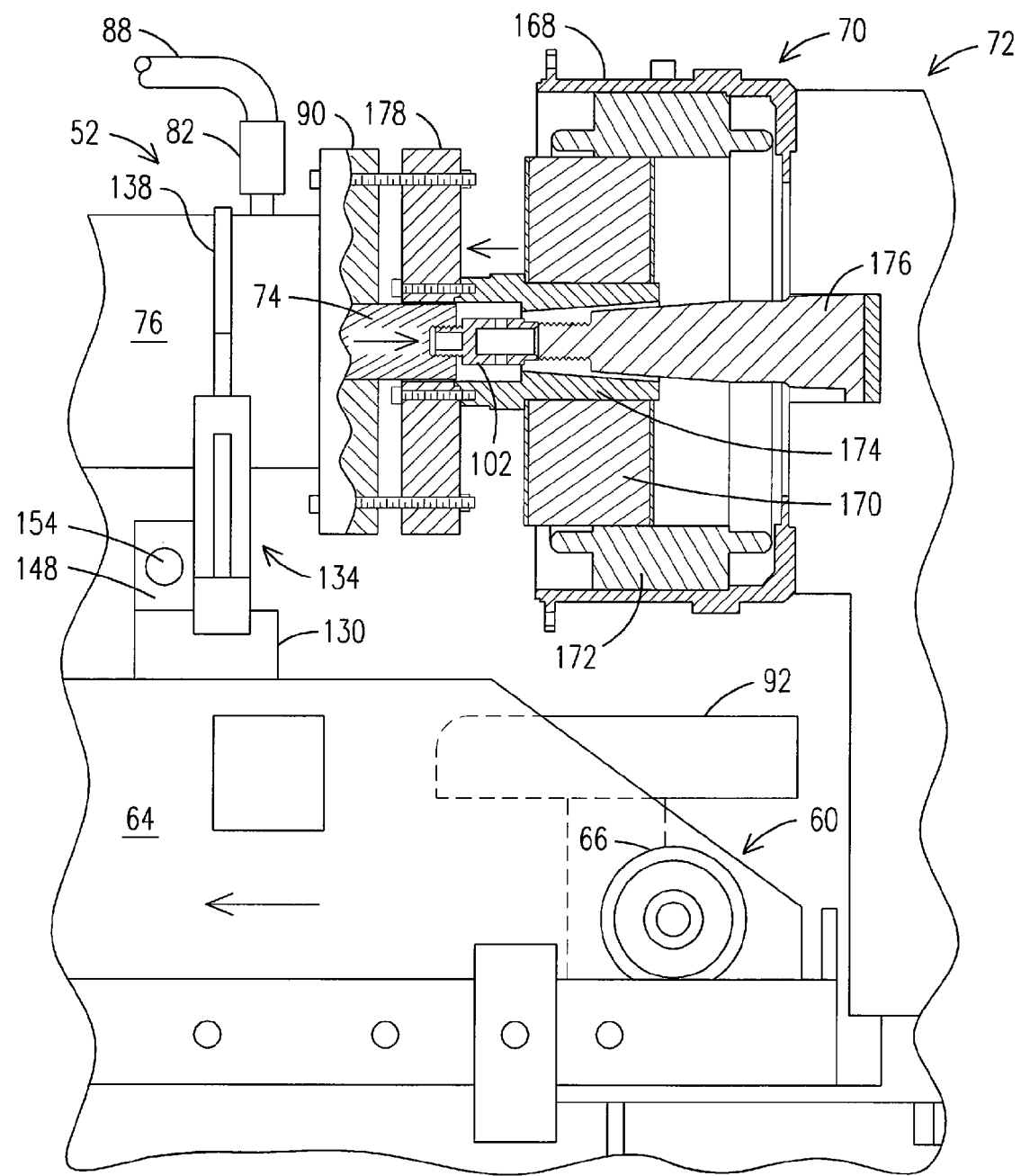
FIG. 12 is a side view of the piston in the tool having been extended with the carriage moving backward and the rotator removed from the motor.

In reference to FIGS. 10, 11, and 12, there is shown the apparatus 50 and tool 52 used for the removal of a rotor 170 from the electric motor 70. Reference will also be made to the flow chart in FIG. 16 for disassembly of the motor 70. There is provided, in FIG. 11, a sectional view of the electric motor 70, which includes a housing 168 mounted to the machine 72 and a stator 172 mounted to the housing 168. The rotor 170 is operatively connected to the machine shaft 176 via the rotor sleeve 174. During operation of the electric motor 70, the rotator rotates providing a rotational force to the shaft 176 for operation of the machine 72. The shaft 176 has a male threaded end on which a shaft extension (not shown) may be attached. Typically, the electric motor 70 includes a fan (not shown) and cover (not shown) mounted on the shaft extension. For purposes of describing embodiments of the invention, these components are not illustrated.

Figures 16, 17:
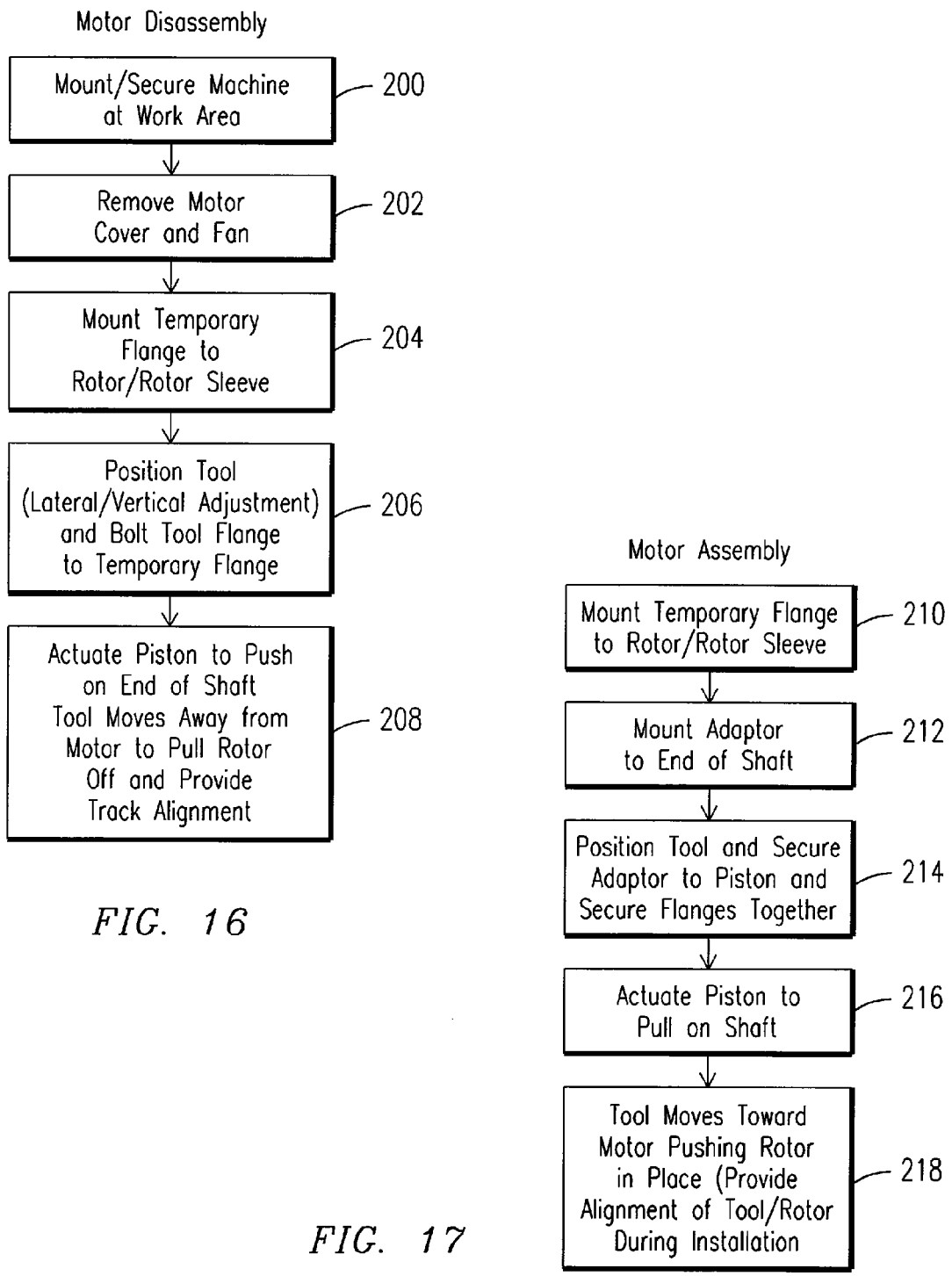
FIG. 16 is a flow chart providing steps for the removal of the rotor from the motor.
FIG. 17 is a flow chart of an embodiment illustrating steps and a method for installing the rotor.

In order to remove the rotor 170 from the electric motor 70, the machine 72 is mounted on the support area 56 of the table 54, as described in step 200, FIG. 16. The motor cover (not shown), fan (not shown), and shaft extension (not shown) are removed (Step 202, FIG. 16). Depending on the type of motor and machine, other components may need to be removed to access the rotor sleeve 174. A temporary flange 178 is then mounted to the rotor sleeve 174 in place of the fan, as described in Step 204, FIG. 16. The carriage 60 and tool 52 are then moved towards the electric motor 70 to position the tool 52 for removal of the rotor 170. (Step 206). The lateral adjustment mechanism 142 and vertical adjustment mechanism 144 are used to concentrically align the first adapter 102, mounted on the piston 74, with an end of the shaft 176. As shown, the first adapter 102 abuts an end of the shaft, which is seated against the lip 116 on the hub 114 of the first adapter 102. The housing flange 90 is then bolted to the temporary flange 178 to secure the tool 52 to the rotor 170, as described in Step 206. The piston 74 is then actuated (Step 208) using the hydraulic pump 78. More specifically, when the hydraulic pump 78 is activated, the piston moves forward towards the machine 72 and motor 70 pushing against the shaft 176. By doing so, the carriage 60 and tool 52 move backward relative to the machine 72 and motor 70. In as much as the tool flange 90 is secured to the temporary flange 178, the tool 52 will pull the rotor 170 from the electric motor 70.

Note, for air compressors (such as those used on locomotives) that may weigh as much as three thousand pounds (3,000 lbs.) (1361 kilograms), having rotors weighing about five hundred pounds (500 lbs.) (226.8 kilograms), roughly about 6000 psi to about 8000 psi may be necessary to pull the rotor 170 from the motor 70. The hydraulic pump 78 is actuated until a predetermined pressure is met, and one or more valves to the port 80 are opened to drive the piston 74 toward the shaft 176 and motor 70. When the piston 74 extends, responsive to the activation of the hydraulic pump 78, it pushes against the shaft 176 forcing the carriage 60 to move backwards or away from the motor 70 removing the rotor 170. (Step 208). The tracks 62 maintain alignment of the tool 52 and rotor 170 relative to components of the motor 70 to avoid damaging the motor 70 components.

The platform 92 disposed between the support area 56 and the carriage 60 is provided to support the rotor 170 or otherwise prevent the rotor 170 from being dropped from the tool 52 and landing on ground damaging the rotor 170. In addition, a stop arm 182 (see FIGS. 4-6) may be mounted to the table 54 and extend over an end of the tool 52 distal the piston 74. When the tool 52 removes the rotor 170, the tool 52 may have a tendency to tilt with the rotor 170 mounted on the end of the piston 74. The stop arm 182 is mounted to the table 54 to minimize the tilt of the tool 52 and stress on the clamps 138. With the rotor 170 having been removed, a crane (not shown) may be used to hoist the rotor 170 and remove it from the tool 52 for maintenance.

Figure 13:
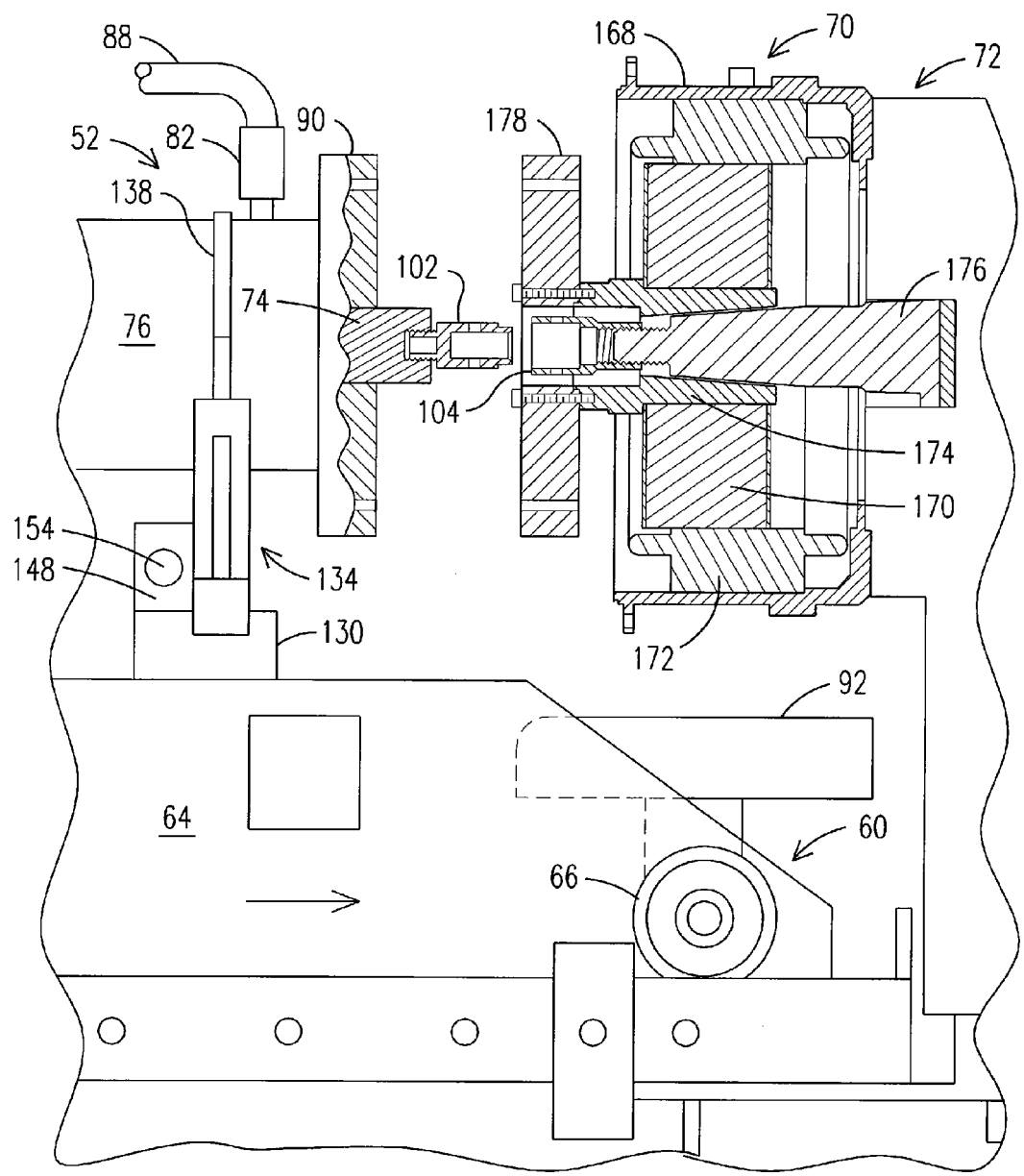
FIG. 13 is a sectional view of the motor with a second adapter engaging the shaft for installation of the rotor.
Figure 14:
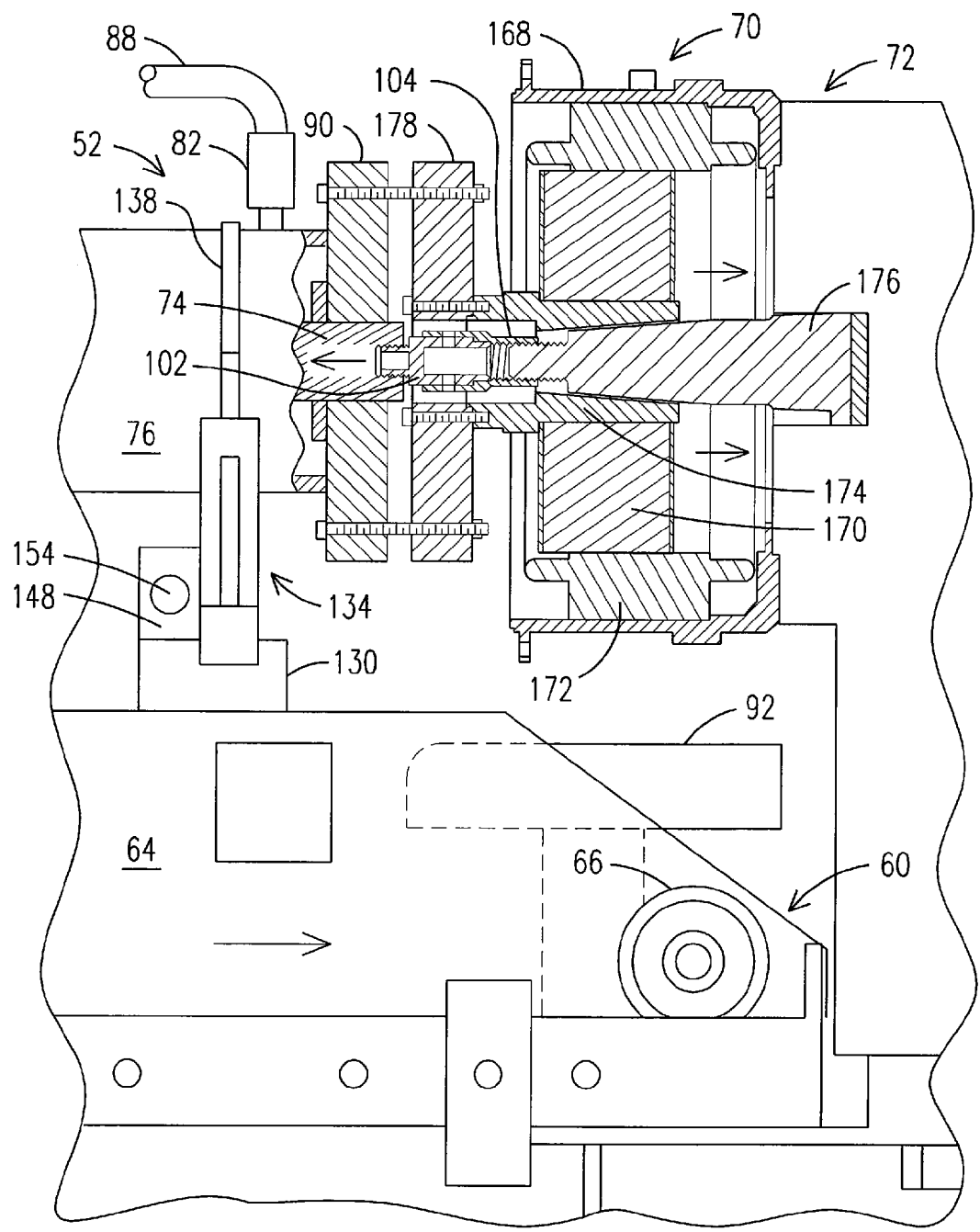
FIG. 14 is a sectional view of the tool with a first adapter positioned in mating relationship with the second adapter, which is attached to the compressor shaft.
Figure 15:
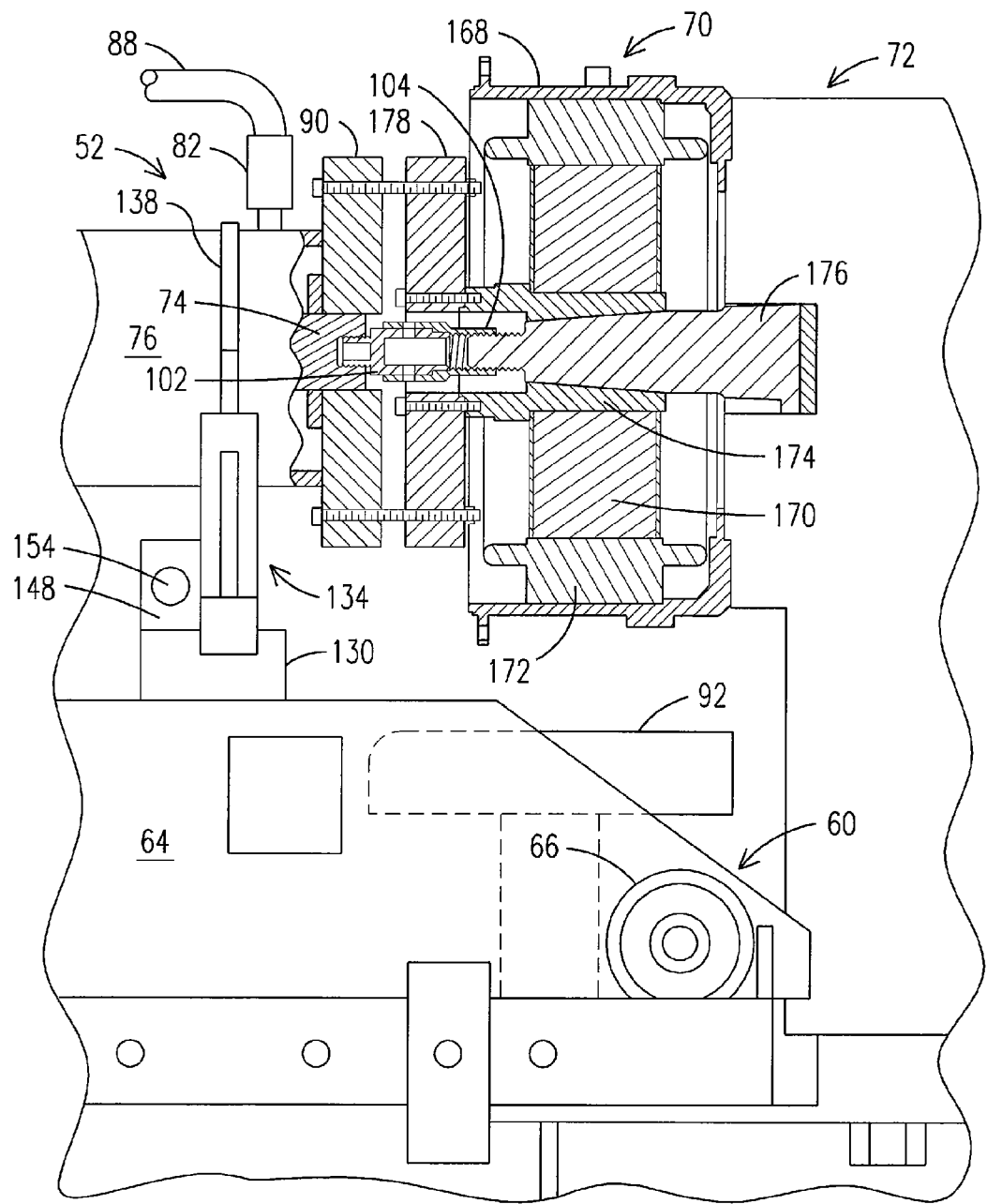
FIG. 15 is a side view of an embodiment of the invention with the piston having been retracted and the carriage pulled toward the motor and compressor for installation of the rotor.

With respect to FIGS. 13, 14, and 15, an installation of the rotor 170 is illustrated. In addition, reference will be made to the steps set forth in the flow chart in FIG. 17. More specifically, in FIG. 13, the motor cover (not shown) and fan (not shown) are removed for installation of the rotor 170. The temporary flange 178 is mounted to the rotor sleeve 174, the rotor 170 is lifted by a crane (not shown), and the rotor sleeve 174 and rotor 170 are aligned with the shaft 176 and pushed into the motor 70 between the stator 172 and shaft 176. (Steps 210 and 212 in FIG. 17). Before the rotor 170 is installed using the tool 52, the second adapter 104 is threaded onto the shaft 176 in Step 214. The first adapter 102 remains mounted on the end of the piston 74 as described above. The carriage 60 and tool 52 are then moved into position and the lateral adjustment assembly 142 and vertical adjustment assembly 144 are actuated to align the first adapter 102 with the second adapter 104.

Once aligned, the carriage 60 and tool 52 are moved forward towards the motor 70 so the first adapter 102 is seated in mating relationship within the second adapter 104, as shown in FIG. 14. The bolt 164 and pin 166 are then put in place to secure the adapters 102, 104 together, and the housing flange 90 is bolted to the temporary flange 178. (Step 214). The rotor 170 and tool 52 are ready for installation. More specifically, the rotor is positioned between the stator 172 and shaft 176 and ready to be forced into an operating position. In order to fix the rotor 170 into its operating position, the piston 74 is actuated to retract, thereby pulling the carriage 60 and rotor 170 towards the motor. (Steps 216 and 218). A control switch on the hydraulic pump is activated so the flow of hydraulic fluid enters the housing 76 through port 82. The hydraulic pump 78 is actuated until a predetermined pressure is met, and one or more valves to the port 82 are opened to retract the piston 74. For air compressors used on locomotives as described above, approximately 6500 psi generated at the hydraulic pump 78 may be necessary to fix the rotor 170 in its operating position. Note that during installation of the rotor 170, the hydraulic pump 78 is actuated in a reverse mode relative to the removal of the rotor 170. After the rotor 170 is installed in its operating position (as seen in FIG. 15), the first adapter 102 and second adapter 104 are detached from one another. The control switch on the hydraulic pump 78 is actuated to reverse the flow of hydraulic fluid, and about 1100 psi may be applied in this reverse direction in order to remove the piston 74 and tool 52 from the rotor 170. Note, during installation the tracks 62 maintain alignment of tool 52 and rotor 170 relative to the motor 70, and components of the motor 70, and in this manner, the rotor 170 is safely installed.

While various embodiments of the present invention have been shown and described herein, it will be obvious that such embodiments are provided by way of example only and not of limitation. Numerous variations, changes and substitutions will occur to those skilled in the art without departing from the teaching of the present invention. Moreover, unless specifically stated, any use of the terms first, second, selected, etc., does not denote any order or importance, but rather the terms first, second, selected, etc., are used to distinguish one element from another. Accordingly, it is intended that the invention be interpreted within the full spirit and scope of the appended claims.

What is claimed is:

1. An apparatus comprising:
a table having a support area that is configured to support and mount a machine and an electric motor having a stationary stator and a rotating rotor that is coupled to a shaft of the machine;
a tool configured to engage and remove the rotor from the motor when the machine is mounted to the table, and the tool is configured to be operatively connected to the table to move back and forth on the table relative to the machine and the motor;
wherein the tool comprises a housing and a piston, wherein the housing is configured to be detachably coupled to the rotor, and wherein the piston is configured for engagement with an end of the shaft, and wherein the piston has an end concentrically aligned with the rotor and the shaft when the piston is positioned for engagement with an end of the shaft;
a driving mechanism configured to be linked to the piston and that is configured to actuate and move the piston in a backward or forward direction relative to the machine and the motor;
a first adapter configured to be mounted to the end of the piston for engaging the end of the shaft when the piston moves forward toward the machine and the motor to remove the rotor from the motor; and
a second adapter detachably coupled to the first adapter and configured for engaging the end of the shaft when the piston moves backward relative to the machine and the motor to install the rotor in the motor;
wherein the housing of the tool is configured to move on the table in a direction that is opposite to a direction of movement of the piston to remove or install the rotor responsive to the movement of the piston.

2. The apparatus of claim 1, wherein the first adapter has a body portion, a first end mounted to the end of the piston, and a second end having a hub with a recessed rim for receiving the end of the shaft.

3. The apparatus of claim 2, wherein the second adapter has a body portion having an inside diameter that is larger than an outside of the body portion of the first adapter, the body portion of the second adapter for receiving the hub and the body portion of the first adapter, wherein the second adapter also includes a hub with a female threaded portion for engaging an external threaded portion on the shaft.

4. The apparatus of claim 1, further comprising one or more adjustment mechanisms connected to the table for laterally or vertically adjusting the housing and the piston relative to the rotor so the end of the piston is concentrically aligned with the rotor and the shaft.

5. The apparatus of claim 4, wherein the one or more adjustment mechanisms comprise a lateral adjustment mechanism for laterally adjusting the housing and piston relative to the rotor, the lateral adjustment mechanism including at least two cross-rails that are spaced apart and parallel to one another and that are orthogonally disposed relative to a longitudinal axis of the tool, and each of the cross-rails has a channel in which brackets that support the tool on the table are disposed and an adjustment handle operatively connected to the brackets to selectively adjust a lateral position of the tool and the piston relative to the rotor.

6. The apparatus of claim 4, wherein the one or more adjustment mechanisms comprise a vertical adjustment mechanism for vertically adjusting the tool relative to the housing, the vertical adjustment mechanism including at least two brackets each having a vertically disposed channel and a support plate for supporting the tool on the table and having parallel edges positioned in the channels and a rotatable adjustment handle that is operatively connected to the plate to selectively adjust a height of the tool and the piston relative to the machine and the motor.

7. The apparatus of claim 1, wherein the table comprises a tool alignment system including at least one track that is disposed parallel to a central axis of the tool, and further comprising a carriage that supports the housing and is operatively connected to the track to maintain alignment of the rotor relative to a central axis of the motor during installation or removal of the rotor.

8. The apparatus of claim 1, wherein the driving mechanism comprises a hydraulic system that includes a hydraulic reversible pump, and at least a portion of the piston is mounted within a cylinder supported in the housing, and the cylinder is in fluid communication with the hydraulic reversible pump to actuate and move the piston backward and forward.

9. The apparatus of claim 1, further comprising a platform mounted on the table and disposed between the tool and the support area for supporting the rotor when removed from the motor.

10. An apparatus comprising:

a table having a support area that is configured to support and mount a machine and an electric motor having a stationary stator and a rotating rotor that is coupled to a shaft of the machine; and a tool configured to engage and remove the rotor from the motor when the machine is mounted to the table, and the tool is configured to be operatively connected to the table to move back and forth on the table relative to the machine and the motor, wherein the tool comprises a housing, a piston, and at least one adapter mounted to an end of the piston, the housing configured to be detachably coupled to the rotor, the at least one adapter configured for engagement with an end of the shaft and to be concentrically aligned with the rotor and the shaft when the piston and the at least one adapter are positioned for engagement with the end of the shaft;

a driving mechanism configured to be linked to the piston, the driving mechanism configured to actuate and move the piston in a backward or forward direction relative to the machine and the motor;

wherein the housing of the tool is configured to move on the table in a direction that is opposite to a direction of movement of the piston to remove or install the rotor responsive to the movement of the piston; and wherein the at least one adapter comprises a first adapter and a second adapter, the first adapter configured to be mounted to the end of the piston for engaging the end of the shaft when the piston moves forward toward the machine and the motor to remove the rotor from the motor, the second adapter detachably coupled to the first adapter and configured for engaging the end of the shaft when the piston moves backward relative to the machine and the motor to install the rotor in the motor.

11. The apparatus of claim 10, wherein the first adapter of the tool has a body portion, a first end configured to be mounted to the end of the piston, and a second end having a hub with a recessed rim that is configured to receive the end of the shaft.

12. The apparatus of claim 11, wherein the second adapter of the tool has a body portion having an inside diameter that is larger than an outside of the body portion of the first adapter of the tool, the body portion of the second adapter configured to receive the hub and the body portion of the first adapter, wherein the second adapter also includes a hub with a female threaded portion that is configured to engage an external threaded portion on the shaft.

\* \* \* \* \*